United States Patent
Shi et al.

(10) Patent No.: US 10,805,976 B2
(45) Date of Patent: Oct. 13, 2020

(54) SIGNAL PROCESSING METHOD AND USER EQUIPMENT

(71) Applicant: Huawei Device Co., Ltd., Dongguan (CN)

(72) Inventors: Shuai Shi, Wuhan (CN); Bei Dai, Wuhan (CN); Xiaojian Liu, Wuhan (CN)

(73) Assignee: Huawei Device Co., Ltd., Dongguan (CN)

( * ) Notice: Subject to any disclaimer, the term of this patent is extended or adjusted under 35 U.S.C. 154(b) by 435 days.

(21) Appl. No.: 15/300,078

(22) PCT Filed: Mar. 28, 2014

(86) PCT No.: PCT/CN2014/074259
§ 371 (c)(1),
(2) Date: Sep. 28, 2016

(87) PCT Pub. No.: WO2015/143699
PCT Pub. Date: Oct. 1, 2015

(65) Prior Publication Data
US 2017/0135149 A1    May 11, 2017

(51) Int. Cl.
*H04W 36/00* (2009.01)
*H04W 76/25* (2018.01)
*H04W 48/20* (2009.01)
*H04B 17/382* (2015.01)
*H04B 17/318* (2015.01)
*H04W 36/08* (2009.01)
(Continued)

(52) U.S. Cl.
CPC ...... *H04W 76/25* (2018.02); *H04B 17/318* (2015.01); *H04B 17/382* (2015.01); *H04W 36/08* (2013.01); *H04W 48/16* (2013.01); *H04W 48/20* (2013.01); *H04W 52/367* (2013.01)

(58) Field of Classification Search
None
See application file for complete search history.

(56) References Cited

U.S. PATENT DOCUMENTS

2006/0030324 A1* 2/2006 Hsu .................. H04W 36/30
                                                                  455/437
2010/0311421 A1   12/2010 Mach

FOREIGN PATENT DOCUMENTS

CN    101965058 A    2/2011
CN    102045813 A    5/2011
(Continued)

OTHER PUBLICATIONS

GSM05.08_—_ETSI_GSM_Technical_Specification_—_GSM_05. 08_July_1996_Version_5.1.0.pdf.*
(Continued)

*Primary Examiner* — Jinsong Hu
*Assistant Examiner* — Alexander J Yi
(74) *Attorney, Agent, or Firm* — Slater Matsil, LLP (57) ABSTRACT

Embodiments relate to a signaling processing method and user equipment. The signaling processing method includes: measuring a received signal level of user equipment with respect to a current cell, determining a camping parameter of the user equipment with respect to the cell according to the received signal level, making compensation for the camping parameter, and determining that the user equipment camps on the cell if the camping parameter after compensation is greater than a preset camping threshold.

9 Claims, 2 Drawing Sheets

(51) Int. Cl.
   *H04W 48/16*   (2009.01)
   *H04W 52/36*   (2009.01)

(56) References Cited

FOREIGN PATENT DOCUMENTS

CN          102104910 A    6/2011
WO      2010140057 A1    12/2010

OTHER PUBLICATIONS

STIC-EIC2600_search_result-15300078.pdf.*
European Telecommunications Standard Institute GSM Technical Specification, "Digital cellular telecommunication system (Phase 2+); Radio subsystem link control," GSM 05.08, Jul. 1996, Version 5.1.0, 39 pages.

* cited by examiner

FIG. 4

SIGNAL PROCESSING METHOD AND USER EQUIPMENT

CROSS-REFERENCE TO RELATED APPLICATIONS

This application claims the benefit of International Application No. PCT/CN2014/074259, filed on Mar. 28, 2014, which application is hereby incorporated herein by reference.

TECHNICAL FIELD

The present invention relates to the field of communications technologies, and in particular, to a signal processing method and user equipment.

BACKGROUND

Generally, a measurement unit that is in user equipment and used to measure a received signal level is calibrated, and there is no error or an error may be ignored. Therefore, a received signal level obtained by means of measurement by the measurement unit is considered an actual received signal level of the user equipment in a current cell.

However, although the measurement unit is calibrated, it does not mean that there is indeed no measurement error or an error may be ignored. If hardware performance of the measurement unit is relatively poor, a non-ignorable error may exist even if calibration has been performed. As a result, the received signal level obtained by means of measurement by the measurement unit suffers relatively large attenuation. Accordingly, a camping parameter determined according to the received signal level also has a relatively great error, which affects a result of determining whether to camp on the current cell. This makes the user equipment likely to disconnect from a network, affecting service use of a user.

SUMMARY

In view of this, embodiments of the present invention provide a signal processing method and user equipment, which can improve accuracy of determining whether to camp on a current cell, thereby preventing the user equipment from disconnecting from a network and effectively improving user experience.

According to a first aspect, an embodiment of the present invention provides a signal processing method. The method includes: measuring a received signal level of user equipment with respect to a current cell, and determining a camping parameter of the user equipment with respect to the cell according to the received signal level. The method also includes making compensation for the camping parameter, and determining that the user equipment camps on the cell if the camping parameter after compensation is greater than a preset camping threshold.

In a first possible implementation manner of the first aspect, the making compensation for the camping parameter is specifically: making compensation for the camping parameter by means of piecewise linear compensation.

With reference to the first possible implementation manner of the first aspect, in a second possible implementation manner, the making compensation for the camping parameter by means of piecewise linear compensation is specifically: determining a compensation interval in which the camping parameter is located according to a preset compensation interval; determining a compensation value corresponding to the compensation interval in which the camping parameter is located according to a preset correspondence between a preset compensation interval and a compensation value; and adding the camping parameter and the determined compensation value to make compensation for the camping parameter.

With reference to the first aspect, or the first possible implementation manner of the first aspect, or the second possible implementation manner of the first aspect, in a third possible implementation manner, the determining a camping parameter of the user equipment with respect to the cell according to the received signal level is specifically: receiving a minimum access level of the cell sent by a base station in the cell and a maximum transmit power of the user equipment on a signaling channel; obtaining a maximum output power of the user equipment; and calculating the camping parameter according to the minimum access level of the cell, the maximum transmit power of the user equipment on a signaling channel, the maximum output power of the user equipment, and the received signal level.

With reference to the first aspect, or the first possible implementation manner of the first aspect, or the second possible implementation manner of the first aspect, or the third possible implementation manner of the first aspect, in a fourth implementation manner, after the making compensation for the camping parameter, the method further includes: performing cell reselection if the camping parameter after compensation is not greater than the preset camping threshold.

According to a second aspect, an embodiment of the present invention provides user equipment. The user equipment includes: a measurement unit, configured to measure a received signal level of the user equipment with respect to a current cell. The user equipment also includes a first determining unit, configured to determine a camping parameter of the user equipment with respect to the cell according to the received signal level. The user equipment also includes a compensation unit, configured to make compensation for the camping parameter. The user equipment also includes a second determining unit, configured to determine that the user equipment camps on the cell if the camping parameter after compensation is greater than a preset camping threshold.

In a first possible implementation manner of the second aspect, the compensation unit is specifically configured to make compensation for the camping parameter by means of piecewise linear compensation.

With reference to the first possible implementation manner of the second aspect, in a second possible implementation manner, the compensation unit is specifically configured to: determine a compensation interval in which the camping parameter is located according to a preset compensation interval; determine a compensation value corresponding to the compensation interval in which the camping parameter is located according to a preset correspondence between a compensation interval and a compensation value; and add the camping parameter and the determined compensation value to make compensation for the camping parameter.

With reference to the second aspect, or the first possible implementation manner of the second aspect, or the second possible implementation manner of the second aspect, in a third possible implementation manner, the first determining unit is specifically configured to: receive a minimum access level of the cell sent by a base station in the cell and a maximum transmit power of the user equipment on a signaling channel; obtain a maximum output power of the user equipment; and calculate the camping parameter according to the minimum access level of the cell, the maximum transmit power of the user equipment on a signaling channel, the maximum output power of the user equipment, and the received signal level. With reference to the second aspect, or the first possible implementation manner of the second aspect, or the second possible implementation manner of the second aspect, or the third possible implementation manner of the second aspect, in a fourth possible implementation manner, the user equipment further includes a selection unit, configured to perform cell reselection if the camping parameter after compensation is not greater than the preset camping threshold.

According to a third aspect, an embodiment of the present invention provides user equipment. The user equipment includes: a communications interface; a processor; a memory; and an application program physically stored in the memory, where the application program includes an instruction that is capable of making the processor execute the following process: measuring a received signal level of the user equipment with respect to a current cell; determining a camping parameter of the user equipment with respect to the cell according to the received signal level; making compensation for the camping parameter; and determining that the user equipment camps on the cell if the camping parameter after compensation is greater than a preset camping threshold.

In a first possible implementation manner of the third aspect, the making compensation for the camping parameter is specifically: making compensation for the camping parameter by means of piecewise linear compensation.

With reference to the first possible implementation manner of the third aspect, in a second possible implementation manner, the making compensation for the camping parameter by means of piecewise linear compensation is specifically: determining a compensation interval in which the camping parameter is located according to a preset compensation interval; determining a compensation value corresponding to the compensation interval in which the camping parameter is located according to a preset correspondence between a compensation interval and a compensation value; and adding the camping parameter and the determined compensation value to make compensation for the camping parameter. With reference to the third aspect, or the first possible implementation manner of the third aspect, or the second possible implementation manner of the third aspect, in a third possible implementation manner, the determining a camping parameter of the user equipment with respect to the cell according to the received signal level is specifically: receiving a minimum access level of the cell sent by a base station in the cell and a maximum transmit power of the user equipment on a signaling channel; obtaining a maximum output power of the user equipment; and calculating the camping parameter according to the minimum access level of the cell, the maximum transmit power of the user equipment on a signaling channel, the maximum output power of the user equipment, and the received signal level.

With reference to the third aspect, or the first possible implementation manner of the third aspect, or the second possible implementation manner of the third aspect, or the third possible implementation manner of the third aspect, in a fourth possible implementation manner, the application program further includes an instruction that is capable of making the processor execute the following process: after the making compensation for the camping parameter, performing cell reselection if the camping parameter after compensation is not greater than the preset camping threshold.

In the foregoing solutions, user equipment determines a camping parameter with respect to a cell according to a received signal level obtained by means of measurement, then makes compensation for the camping parameter, and determines that the user equipment camps on the cell if the camping parameter after compensation is greater than a preset camping threshold. Because the camping parameter used to determine whether to camp on the cell is the camping parameter after compensation, the determining, according to the camping parameter after compensation, whether to camp on the current cell is more accurate, which prevents the user equipment from disconnecting from a network and effectively improves user experience.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
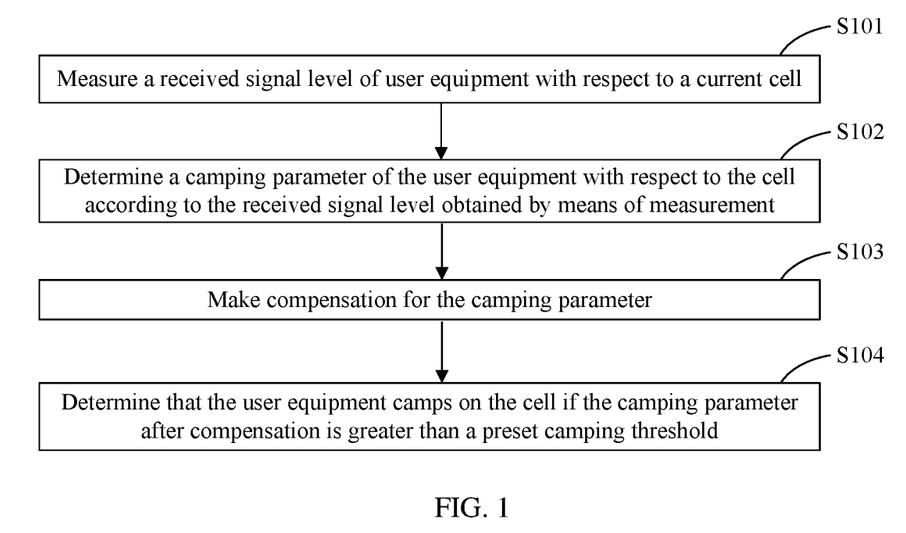
FIG. 1 is a schematic flowchart of a signal processing method according to Embodiment 1 of the present invention.

The following details a signal processing method according to Embodiment 1 of the present invention by using FIG. 1 as an example. FIG. 1 is a schematic flowchart of the signal processing method according to Embodiment 1 of the present invention. The signal processing method is executed by user equipment.

As shown in FIG. 1, the signal processing method includes the following steps.

Step S101: Measure a received signal level of the user equipment with respect to a current cell.

The user equipment measures the received signal level RXLEV of the user equipment with respect to the current cell by using an antenna radio frequency.

Step S102: Determine a camping parameter of the user equipment with respect to the cell according to the received signal level obtained by means of measurement.

The user equipment receives a minimum access level of the cell sent by a base station in the cell in which the user equipment is located and a maximum transmit power of the user equipment on a signaling channel, obtains a maximum output power of the user equipment, and then calculates the camping parameter according to the minimum access level of the cell, the maximum transmit power of the user equipment on a signaling channel, the maximum output power of the user equipment, and the received signal level.

Specifically, for a WCDMA network, the user equipment receives the minimum access level RXLEV_ACCESS_MIN of the cell sent by the base station in the cell in which the user equipment is located and the maximum transmit power UE_TXPWR_MAX_RACH of the user equipment on a random access channel, obtains the maximum output power P_MAX of the user equipment, and calculates the camping parameter S of the user equipment with respect to the cell by using the following formula (1):

$$S=RXLEV-RXLEV\_ACCESS\_MIN-\max\{UE\_TXPWR\_MAX\_RACH-P\_MAX, 0\} \quad (1)$$

For a GSM network, the user equipment receives the minimum access level RXLEV_ACCESS_MIN of the cell sent by the base station in the cell in which the user equipment is located and the maximum transmit power MS_TXPWR_MAX_CCH of the user equipment on a control channel, obtains the maximum output power P_MAX of the user equipment, and calculates the camping parameter $C_1$ of the user equipment with respect to the cell by using the following formula (2):

$$C1=RXLEV-RXLEV\_ACCESS\_MIN-\max\{MS\_TXPWR\_MAX\_CCH-P\_MAX, 0\} \quad (2)$$

Step S103: Make compensation for the camping parameter.

The user equipment makes compensation for the camping parameter by means of piecewise linear compensation. Specifically, the piecewise linear compensation may include the following steps: 103a: Determine a compensation interval in which the camping parameter is located according to a preset compensation interval. 103b: Determine a compensation value corresponding to the compensation interval in which the camping parameter is located according to a preset correspondence between a compensation interval and a compensation value. 104c: Add the camping parameter and the determined compensation value to implement compensation for the camping parameter. The preset correspondence between a compensation interval and a compensation value may be preset by means of measurement.

Specifically, for the WCDMA network, a camping parameter Sc after compensation may be calculated by using the following formula (3):

$$S_C = f(S) = \begin{cases} S+\Delta 1 & S < A \\ S+\Delta 2 & A \leq S < B \\ S+\Delta 3 & B \leq S < C \\ S+\Delta 4 & S \geq C \end{cases} \quad (3)$$

A piecewise linear compensation function $f(S)$ is used to make compensation for the camping parameter S, where $(-\infty, A)$, $[A, B)$, $[B, C)$, and $[C, +\infty)$ are four preset compensation intervals, $\Delta 1$, $\Delta 2$, $\Delta 3$, and $\Delta 4$ are compensation values respectively corresponding to the four compensation intervals $(-\infty, A)$, $[A, B)$, $[B, C)$, and $[C, +\infty)$, and $\Delta 1 > \Delta 2 > \Delta 3 > \Delta 4$.

The compensation intervals and the compensation value corresponding to each compensation interval are obtained by conducting a measurement experiment. Specifically, at a same place and same time, a received signal level of user equipment with poor hardware performance and a received signal level of user equipment with good hardware performance are separately measured for many times. A camping parameter of the user equipment with poor hardware performance and a camping parameter of the user equipment with good hardware performance are separately determined by using the method in step S102, so as to respectively obtain a curve relationship between the camping parameter and the received signal level of the user equipment with poor hardware performance and a curve relationship between the camping parameter and the received signal level of the user equipment with good hardware performance. A range of a compensation interval and a compensation value corresponding to each compensation interval are determined according to the curve relationship between the camping parameter and the received signal level of the user equipment with poor hardware performance and the curve relationship between the camping parameter and the received signal level of the user equipment with good hardware performance.

Figure 1A:
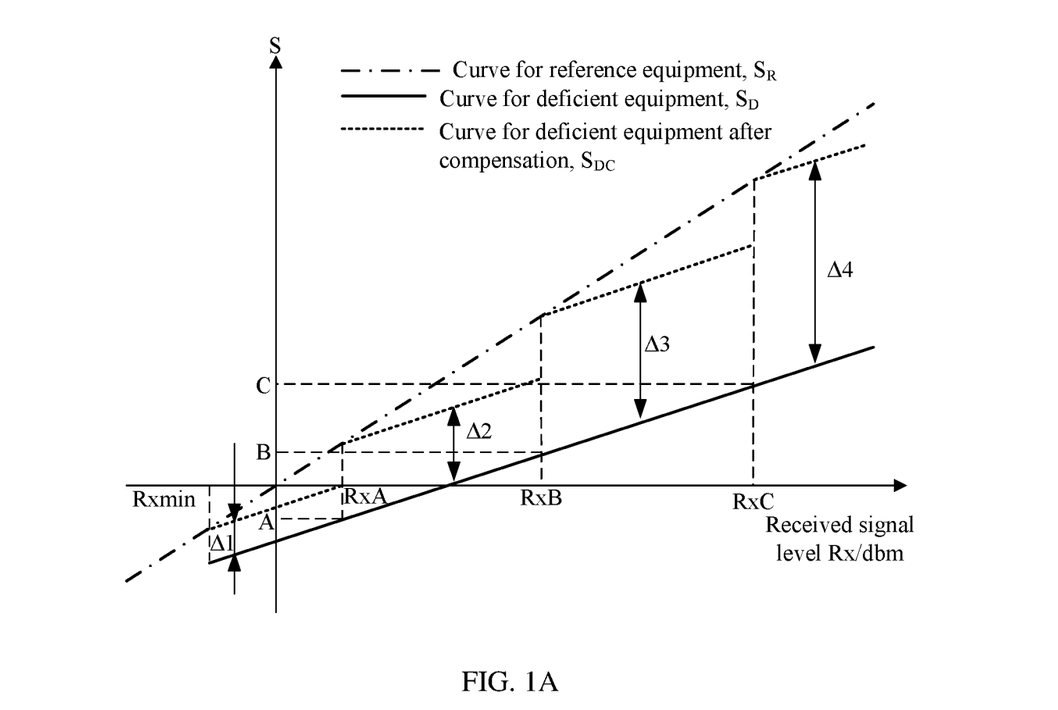
FIG. 1A is a curve diagram of an S value and a received signal level of reference equipment and deficient equipment according to Embodiment 1 of the present invention.

A WCDMA network is used as a specific example. As shown in FIG. 1A, a batch of user equipments with poor hardware performance (deficient equipment) and a batch of user equipments with good hardware performance (reference equipment) are sampled and measured, and by using the formula (i), a curve relationship between an S value and a received signal level of the reference equipment and that of the deficient equipment are obtained separately. The curve for the reference equipment is $S_R$, and the curve for the deficient equipment is $S_D$. In this example, the received signal level measured by the deficient equipment has a linear error, and an $S_D$ value calculated by using the formula (1) also has a linear error, as shown by a solid line in FIG. 1A. With respect to the linear error, both compensation complexity and precision are considered. Optionally, four compensation intervals $(-\infty, A)$, $[A, B)$, $[B, C)$, and $[C, +\infty)$ are acquired on an S axis according to a range of the $S_D$ value. Preferably, the two intervals $[A, B)$ and $[B, C)$ are the same in width, and they cover most $S_D$ values, for example, 60% of the range. Intervals on a received signal level axis corresponding to the four intervals are respectively $(+\infty, Rx_A)$, $[Rx_A, Rx_B)$, $[Rx_B, Rx_C)$, and $[Rx_C, +\infty)$. Correspondingly, the two intervals $[Rx_A, Rx_B)$ and $[Rx_B, Rx_c)$ are also the same in width. The compensation values $\Delta 1$, $\Delta 2$, $\Delta 3$, and $\Delta 4$ are determined in the following manner: $\Delta 1 = S_R(R_{Xmin}) - S_D(R_{Xmin})$, where Rxmin is a minimum received signal level that can be measured by the deficient equipment; $\Delta 2 = S_R(R_{XA}) - S_D(R_{XA})$; $\Delta 3 = S_R(R_{XB}) - S_D(R_{XB})$; $\Delta 3 = S_R(R_{XC}) - S_D(R_{XC})$.

The determined compensation intervals $(-\infty, A)$, $[A, B)$, $[B, C)$, and $[C, +\infty)$ and the compensation values $\Delta 1$, $\Delta 2$, $\Delta 3$, and $\Delta 4$ are stored in the user equipment. Preferably, the compensation intervals $(-\infty, A)$, $[A, B)$, $[B, C)$, and $[C, +cc)$ and the compensation values $\Delta 1$, $\Delta 2$, $\Delta 3$, and $\Delta 4$ are stored in the user equipment in a form of a compensation list. The compensation list includes a correspondence between the compensation intervals and the compensation values, that is, $(-\infty, A)$ corresponds to $\Delta 1$, $[A, B)$ corresponds to $\Delta 2$, $[B, C)$ corresponds to $\Delta 3$, and $[C, +\infty)$ corresponds to $\Delta 4$.

After determining the camping parameter of the user equipment with respect to the cell according to the received signal level obtained by means of measurement, the user equipment determines the compensation interval in which the camping parameter is located by using the pre-stored compensation list, determines a compensation value corresponding to the compensation interval in which the camping parameter is located according to the correspondence between the compensation intervals and the compensation values that is in the compensation list, and adds the camping parameter and the determined compensation value to implement compensation for the camping parameter.

It can be seen from FIG. 1A that the S value of the deficient equipment is compensated by using the formula (3) and the compensation interval and the compensation value that are determined in the foregoing method, different compensation is performed according to different S values, so that an S value after compensation approximates the S value of the reference equipment.

It should be noted that the compensation interval and the compensation value are not limited to the four compensation intervals and the four compensation values provided in the embodiment of the present invention. More compensation intervals and compensation values may be acquired according to an actual circumstance. The present invention does not impose any limitation thereon.

Similarly, for the GSM network, a camping parameter $C1_C$ after compensation may be calculated by using the following formula (4):

$$C1_C = f(C1) = \begin{cases} C1 + \Delta 5 & C1 < X \\ C1 + \Delta 6 & X \leq C1 < Y \\ C1 + \Delta 7 & Y \leq C1 < Z \\ C1 + \Delta 8 & C1 \geq Z \end{cases} \quad (4)$$

A piecewise linear compensation function $f(C1)$ is used to make compensation for the camping parameter $C_1$, where $(-\infty, X)$, $[X, Y)$, $[Y, Z)$, and $[Z, +\infty)$ are four preset compensation intervals, $\Delta 5$, $\Delta 6$, $\Delta 7$, and $\Delta 8$ are compensation values respectively corresponding to the four compensation intervals $(-\infty, X)$, $[X, Y)$, $[Y, Z)$, and $[Z, +\infty)$, and $\Delta 5 > \Delta 6 > \Delta 7 > \Delta 8$.

The compensation intervals and the compensation value corresponding to each compensation interval are obtained by conducting a measurement experiment. Specifically, at a same place and same time, a received signal level of user equipment with poor hardware performance and a received signal level of user equipment with good hardware performance are separately measured for many times. A camping parameter of the user equipment with poor hardware performance and a camping parameter of the user equipment with good hardware performance are separately determined by using the method in step S102, so as to respectively obtain a curve relationship between the camping parameter and the received signal level of the user equipment with poor hardware performance and a curve relationship between the camping parameter and the received signal level of the user equipment with good hardware performance. A range of a compensation interval and a compensation value corresponding to each compensation interval are determined according to the curve relationship between the camping parameter and the received signal level of the user equipment with poor hardware performance and the curve relationship between the camping parameter and the received signal level of the user equipment with good hardware performance.

Specifically, a principle for determining the compensation intervals $(-\infty, X)$, $[X, Y)$, $[Y, Z)$, and $[Z, +\infty)$ and the compensation values $\Delta 5$, $\Delta 6$, $\Delta 7$, and $\Delta 8$ is the same as the principle for determining the compensation intervals $(-\infty, A)$, $[A, B)$, $[B, C)$, and $[C, +\infty)$ and the compensation values $\Delta 1$, $\Delta 2$, $\Delta 3$, and $\Delta 4$, and details are not described repeatedly herein.

When making compensation for the camping parameter by means of piecewise linear compensation, the user equipment may make different compensation according to different errors of the camping parameter. In addition, using piecewise linear compensation can simplify calculation with higher efficiency and higher compensation precision.

Step S104: Determine that the user equipment camps on the cell if the camping parameter after compensation is greater than a preset camping threshold.

The user equipment determines, according to the camping parameter after compensation, whether to camp on the cell in which the user equipment is located currently. If the camping parameter after compensation is greater than the preset camping threshold, it is determined that the user equipment camps on the cell. If the camping parameter after compensation is less than the preset camping threshold, cell reselection is performed and step S101 to step S104 are performed again.

According to the signal processing method in Embodiment 1 of the present invention, user equipment determines a camping parameter with respect to a cell according to a received signal level obtained by means of measurement, then makes compensation for the camping parameter, and determines that the user equipment camps on the cell if the camping parameter after compensation is greater than a preset camping threshold. Because the camping parameter used to determine whether to camp on the cell is the camping parameter after compensation, the determining, according to the camping parameter after compensation, whether to camp on the current cell is more accurate, which prevents the user equipment from disconnecting from a network and effectively improves user experience.

Figure 2:
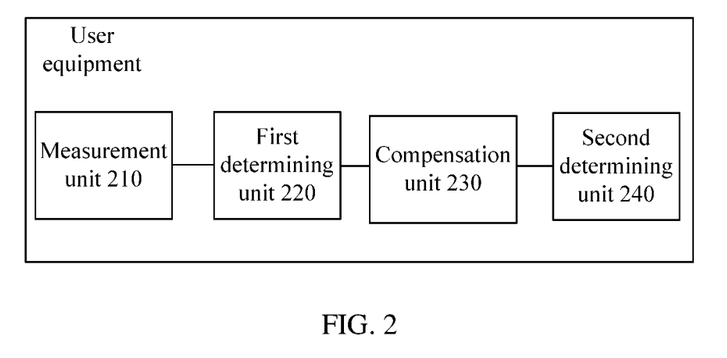
FIG. 2 is a schematic structural diagram of user equipment according to Embodiment 2 of the present invention.

The following details user equipment provided in Embodiment 2 of the present invention by using FIG. 2 as an example. FIG. 2 is a schematic structural diagram of the user equipment provided in Embodiment 2 of the present invention. The user equipment is configured to implement the signal processing method provided in Embodiment 1 of the present invention.

As shown in FIG. 2, the user equipment includes a measurement unit 210, a first determining unit 220, a compensation unit 230, and a second determining unit 240.

The measurement unit 210 is configured to measure a received signal level of the user equipment with respect to a current cell.

The measurement unit 210 includes an antenna radio frequency. The measurement unit 210 measures the received signal level RXLEV of the user equipment with respect to the current cell by using the antenna radio frequency.

The first determining unit 220 is configured to determine a camping parameter of the user equipment with respect to the cell according to the received signal level obtained by means of measurement.

The first determining unit 220 receives a minimum access level of the cell sent by a base station in the cell in which the user equipment is located and a maximum transmit power of the user equipment on a signaling channel, obtains a maximum output power of the user equipment, and then calculates the camping parameter according to the minimum access level of the cell, the maximum transmit power of the user equipment on a signaling channel, the maximum output power of the user equipment, and the received signal level.

Specifically, for a WCDMA network, the first determining unit 220 receives the minimum access level RXLEV_ACCESS_MIN of the cell sent by the base station in the cell in which the user equipment is located and the maximum transmit power UE_TXPWR_MAX_RACH of the user equipment on a random access channel, obtains the maximum output power P_MAX of the user equipment, and calculates the camping parameter S of the user equipment with respect to the cell by using the following formula (1):

$$S = RXLEV - RXLEV\_ACCESS\_MIN - \max\{UE\_TXPWR\_MAX\_RACH - P\_MAX, 0\} \quad (1)$$

For a GSM network, the first determining unit 220 receives the minimum access level RXLEV_ACCESS_MIN of the cell sent by the base station in the cell in which the user equipment is located and the maximum transmit power MS_TXPWR_MAX_CCH of the user equipment on a control channel, obtains the maximum output power P_MAX of the user equipment, and calculates the camping parameter $C_1$ of the user equipment with respect to the cell by using the following formula (2):

$$C1 = RXLEV - RXLEV\_ACCESS\_MIN - \max\{MS\_TXPWR\_MAX\_RACH - P\_MAX, 0\} \quad (2)$$

The compensation unit 230 is configured to make compensation for the camping parameter.

The compensation unit 230 makes compensation for the camping parameter by means of piecewise linear compensation. Specifically, the compensation unit 230 is specifically configured to: determine a compensation interval in which the camping parameter is located according to a preset compensation interval; determine a compensation value corresponding to the compensation interval in which the camping parameter is located according to a preset correspondence between a compensation interval and a compensation value; and add the camping parameter and the determined compensation value to implement compensation for the camping parameter. The preset correspondence between a compensation interval and a compensation value may be preset by means of measurement.

Specifically, for the WCDMA network, a camping parameter Sc after compensation may be calculated by the compensation unit 230 by using the following formula (3):

$$S_C = f(S) = \begin{cases} S + \Delta 1 & S < A \\ S + \Delta 2 & A \leq S < B \\ S + \Delta 3 & B \leq S < C \\ S + \Delta 4 & S \geq C \end{cases} \quad (3)$$

The compensation unit 230 makes compensation for the camping parameter S by using a piecewise linear compensation function $f(S)$, where $(-\infty, A)$, $[A, B)$, $[B, C)$, and $[C, +\infty)$ are four preset compensation intervals, $\Delta 1$, $\Delta 2$, $\Delta 3$, and $\Delta 4$ are compensation values respectively corresponding to the four compensation intervals $(-\infty, A)$, $[A, B)$, $[B, C)$, and $[C, +\infty)$, and $\Delta 1 > \Delta 2 > \Delta 3 > \Delta 4$.

The compensation intervals and the compensation value corresponding to each compensation interval are obtained by conducting a measurement experiment. Specifically, at a same place and same time, a received signal level of user equipment with poor hardware performance and a received signal level of user equipment with good hardware performance are separately measured for many times. A camping parameter of the user equipment with poor hardware performance and a camping parameter of the user equipment with good hardware performance are separately determined by using the method in step S102, so as to respectively obtain a curve relationship between the camping parameter and the received signal level of the user equipment with poor hardware performance and a curve relationship between the camping parameter and the received signal level of the user equipment with good hardware performance. A range of a compensation interval and a compensation value corresponding to each compensation interval are determined according to the curve relationship between the camping parameter and the received signal level of the user equipment with poor hardware performance and the curve relationship between the camping parameter and the received signal level of the user equipment with good hardware performance.

Specifically, a principle for determining the compensation intervals $(-\infty, A)$, $[A, B)$, $[B, C)$, and $[C, +\infty)$ and the compensation values $\Delta 1$, $\Delta 2$, $\Delta 3$, and $\Delta 4$ is the same as the principle for determining the compensation intervals $(-\infty, A)$, $[A, B)$, $[B, C)$, and $[C, +\infty)$ and the compensation values $\Delta 1$, $\Delta 2$, $\Delta 3$, and $\Delta 4$ in Embodiment 1, and details are not described repeatedly herein.

Similarly, for the GSM network, a camping parameter $C1_c$ after compensation may be calculated by the compensation unit 230 by using the following formula (4):

$$C1_C = f(C1) = \begin{cases} C1 + \Delta 5 & C1 < X \\ C1 + \Delta 6 & X \leq C1 < Y \\ C1 + \Delta 7 & Y \leq C1 < Z \\ C1 + \Delta 8 & C1 \geq Z \end{cases} \quad (4)$$

The compensation unit 230 makes compensation for the camping parameter $C_1$ by using a piecewise linear compensation function $f(C1)$, where $(-\infty, X)$, $[X, Y)$, $[Y, Z)$, and $[Z, +\infty)$ are four preset compensation intervals, $\Delta 5$, $\Delta 6$, $\Delta 7$, and $\Delta 8$ are compensation values respectively corresponding to the four compensation intervals $(-\infty, X)$, $[X, Y)$, $[Y, Z)$, and $[Z, +\infty)$, and $\Delta 5 > \Delta 6 > \Delta 7 > \Delta 8$.

The compensation intervals and the compensation value corresponding to each compensation interval are obtained by conducting a measurement experiment. Specifically, at a same place and same time, a received signal level of user equipment with poor hardware performance and a received signal level of user equipment with good hardware performance are separately measured for many times. A camping parameter of the user equipment with poor hardware performance and a camping parameter of the user equipment with good hardware performance are separately determined by using the method in step S102, so as to respectively obtain a curve relationship between the camping parameter and the received signal level of the user equipment with poor hardware performance and a curve relationship between the camping parameter and the received signal level of the user equipment with good hardware performance. A range of a compensation interval and a compensation value corresponding to each compensation interval are determined according to the curve relationship between the camping parameter and the received signal level of the user equipment with poor hardware performance and the curve relationship between the camping parameter and the received signal level of the user equipment with good hardware performance.

Specifically, a principle for determining the compensation intervals $(-\infty, X)$, $[X, Y)$, $[Y, Z)$, and $[Z, +\infty)$ and the compensation values $\Delta 5$, $\Delta 6$, $\Delta 7$, and $\Delta 8$ is the same as the principle for determining the compensation intervals $(-\infty, A)$, $[A, B)$, $[B, C)$, and $[C, +\infty)$ and the compensation values $\Delta 1$, $\Delta 2$, $\Delta 3$, and $\Delta 4$ and details are not described repeatedly herein.

When making compensation for the camping parameter by means of piecewise linear compensation, the compensation unit 230 may make different compensation according to different errors of the camping parameter. In addition, using piecewise linear compensation can simplify calculation with higher efficiency and higher compensation precision.

The second determining unit 240 is configured to determine that the user equipment camps on the cell if the camping parameter after compensation is greater than a preset camping threshold.

Figure 3:
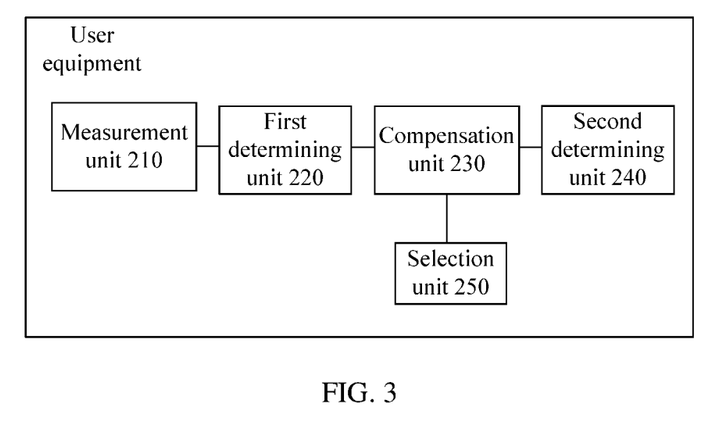
FIG. 3 is a schematic structural diagram of another user equipment according to Embodiment 2 of the present invention.

As shown in FIG. 3, the user equipment may further include a selection unit 250.

The selection unit 250 is configured to perform cell reselection if the camping parameter after compensation is not greater than the preset camping threshold.

According to the user equipment provided in Embodiment 2 of the present invention, the user equipment determines a camping parameter with respect to a cell according to a received signal level obtained by means of measurement, then makes compensation for the camping parameter, and determines that the user equipment camps on the cell if the camping parameter after compensation is greater than a preset camping threshold. Because the camping parameter used to determine whether to camp on the cell is the camping parameter after compensation, the determining, according to the camping parameter after compensation, whether to camp on the current cell is more accurate, which prevents the user equipment from disconnecting from a network and effectively improves user experience.

Figure 4:
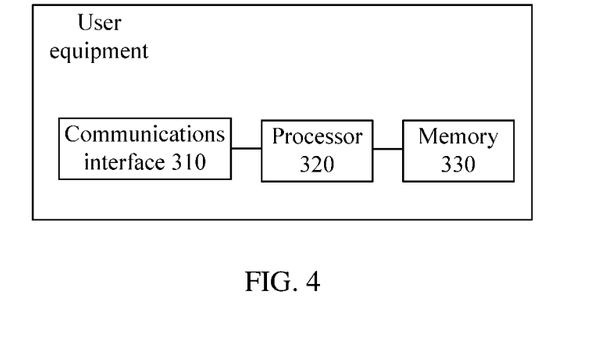
FIG. 4 is a schematic structural diagram of user equipment according to Embodiment 3 of the present invention.

The following details user equipment provided in Embodiment 3 of the present invention by using FIG. 4 as an example. FIG. 4 is a schematic structural diagram of the user equipment provided in Embodiment 3 of the present invention. The user equipment is configured to implement the signal processing method provided in Embodiment 1 of the present invention.

The user equipment includes a communications interface 310, a processor 320, and a memory 330.

The communications interface 310 is configured to communicate with a base station and another communications device.

The memory 330 may be a permanent memory, such as a disk drive and a flash drive. The memory 330 stores an application program, where the application program includes an instruction that is capable of making the processor 320 execute the following process: measuring a received signal level of the user equipment with respect to a current cell; determining a camping parameter of the user equipment with respect to the cell according to the received signal level; making compensation for the camping parameter; and determining that the user equipment camps on the cell if the camping parameter after compensation is greater than a preset camping threshold.

Further, the making compensation for the camping parameter is specifically: making compensation for the camping parameter by means of piecewise linear compensation.

Further, the making compensation for the camping parameter by means of piecewise linear compensation is specifically: determining a compensation interval in which the camping parameter is located according to a preset compensation interval; determine a compensation value corresponding to the compensation interval in which the camping parameter is located according to a preset correspondence between a compensation interval and a compensation value; and adding the camping parameter and the determined compensation value to implement compensation for the camping parameter. Further, the determining a camping parameter of the user equipment with respect to the cell according to the received signal level is specifically: receiving a minimum access level of the cell sent by a base station in the cell and a maximum transmit power of the user equipment on a signaling channel; obtaining a maximum output power of the user equipment; and calculating the camping parameter according to the minimum access level of the cell, the maximum transmit power of the user equipment on a signaling channel, the maximum output power of the user equipment, and the received signal level.

Further, the application program further includes an instruction that is capable of making the processor 320 execute the following process: after the making compensation for the camping parameter, performing cell reselection if the camping parameter after compensation is not greater than the preset camping threshold.

According to the user equipment provided in Embodiment 3 of the present invention, the user equipment determines a camping parameter with respect to a cell according to a received signal level obtained by means of measurement, then makes compensation for the camping parameter, and determines that the user equipment camps on the cell if the camping parameter after compensation is greater than a preset camping threshold. Because the camping parameter used to determine whether to camp on the cell is the camping parameter after compensation, the determining, according to the camping parameter after compensation, whether to camp on the current cell is more accurate, which prevents the user equipment from disconnecting from a network and effectively improves user experience.

A person skilled in the art may be further aware that, the units and algorithm steps in the examples described with reference to the embodiments disclosed in this specification may be implemented by electronic hardware, computer software, or a combination thereof. To clearly describe the interchangeability between hardware and software, the foregoing has generally described compositions and steps of the examples according to functions. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a portable disk, a CD-ROM, or a storage medium in any other form well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method, comprising:
    measuring a received signal level of a user equipment with respect to a current cell;
    determining a camping parameter of the user equipment with respect to the current cell according to the received signal level, wherein determining the camping parameter comprises:

receiving a minimum access level of the current cell sent by a base station serving the current cell and a maximum transmit power of the user equipment on a signaling channel;

obtaining a maximum output power of the user equipment; and calculating the camping parameter according to the minimum access level of the current cell, the maximum transmit power of the user equipment on the signaling channel, the maximum output power of the user equipment, and the received signal level;

compensating for the camping parameter by combining the camping parameter with a selected compensation value and resulting in a compensated camping parameter, wherein the selected compensation value is determined from a mapping between a plurality of compensation values and camping parameter values, the mapping defined according to a compensation function for the plurality of compensation values and the camping parameter values, wherein compensating for the camping parameter comprises compensating for the camping parameter using piecewise linear compensation, and wherein compensating for the camping parameter using piecewise linear compensation comprises:

determining a compensation interval in which the camping parameter is located according to a preset compensation interval, wherein determining the compensation interval in which the camping parameter is located according to the preset compensation interval comprises:

determining that the compensation interval is a first compensation interval when the camping parameter is less than a first camping parameter threshold;

determining that the compensation interval is a second compensation interval when the camping parameter is greater than or equal to the first camping parameter threshold and the camping parameter is less than a second camping parameter threshold;

determining that the compensation interval is a third compensation interval when the camping parameter is greater than or equal to the second camping parameter threshold and the camping parameter is less than a third camping parameter threshold; and determining that the compensation interval is a fourth compensation interval when the camping parameter is greater than or equal to the third camping parameter threshold;

determining the selected compensation value corresponding to the compensation interval in which the camping parameter is located according to a preset correspondence between the compensation interval and the selected compensation value, wherein determining the selected compensation value corresponding to the compensation interval in which the camping parameter is located according to the preset correspondence between the compensation interval and the selected compensation value comprises:

determining that the selected compensation value is a first compensation value when the compensation interval is the first compensation interval;

determining that the selected compensation value is a second compensation value when the compensation interval is the second compensation interval;

determining that the selected compensation value is a third compensation value when the compensation interval is the third compensation interval; and determining that the selected compensation value is a fourth compensation value when the compensation interval is the fourth compensation interval; and adding the camping parameter and the selected compensation value to make the compensated camping parameter; and determining that the user equipment camps on the current cell when the compensated camping parameter exceeds a preset camping threshold.

2. The method according to claim 1, wherein after compensating for the camping parameter, the method further comprises:

performing cell reselection when the preset camping threshold exceeds the compensated camping parameter.

3. User equipment, comprising:

a communications interface;

a processor;

a memory; and an application program physically stored in the memory, wherein the application program comprises instructions that, when executed, cause the processor to:

measure a received signal level of the user equipment with respect to a current cell;

determine a camping parameter of the user equipment with respect to the current cell according to the received signal level, wherein determining the camping parameter comprises:

receiving a minimum access level of the current cell sent by a base station in the current cell and a maximum transmit power of the user equipment on a signaling channel;

obtaining a maximum output power of the user equipment; and calculating the camping parameter according to the minimum access level of the current cell, the maximum transmit power of the user equipment on the signaling channel, the maximum output power of the user equipment, and the received signal level;

compensate for the camping parameter by combining the camping parameter with a selected compensation value and resulting in a compensated camping parameter, wherein the selected compensation value is determined from a mapping between a plurality of compensation values and camping parameter values, the mapping defined according to a compensation function for the plurality of compensation values and the camping parameter values, wherein compensating for the camping parameter comprises compensating for the camping parameter using piecewise linear compensation, and wherein compensating for the camping parameter using piecewise linear compensation comprises:

determining a compensation interval in which the camping parameter is located according to a preset compensation interval, wherein determining the compensation interval in which the camping parameter is located according to the preset compensation interval comprises:

determining that the compensation interval is a first compensation interval when the camping parameter is less than a first camping parameter threshold;

determining that the compensation interval is a second compensation interval when the camping parameter is greater than or equal to the first camping parameter threshold and the camping parameter is less than a second camping parameter threshold;

determining that the compensation interval is a third compensation interval when the camping parameter is greater than or equal to the second camping parameter threshold and the camping parameter is less than a third camping parameter threshold; and determining that the compensation interval is a fourth compensation interval when the camping parameter is greater than or equal to the third camping parameter threshold;

determining the selected compensation value corresponding to the compensation interval in which the camping parameter is located according to a preset correspondence between the compensation interval and the selected compensation value, wherein determining the selected compensation value corresponding to the compensation interval in which the camping parameter is located according to the preset correspondence between the compensation interval and the selected compensation value comprises:

determining that the selected compensation value is a first compensation value when the compensation interval is the first compensation interval;

determining that the selected compensation value is a second compensation value when the compensation interval is the second compensation interval;

determining that the selected compensation value is a third compensation value when the compensation interval is the third compensation interval; and determining that the selected compensation value is a fourth compensation value when the compensation interval is the fourth compensation interval; and adding the camping parameter and the selected compensation value to make the compensated camping parameter; and determine that the user equipment camps on the current cell when the compensated camping parameter exceeds a preset camping threshold.

4. The user equipment according to claim 3, wherein the application program further comprises instructions that, when executed, cause the processor to:

after compensating for the camping parameter, perform cell reselection when the preset camping threshold exceeds the compensated camping parameter.

5. A device, comprising:

means for measuring a received signal level of a user equipment with respect to a current cell;

means for determining a camping parameter of the user equipment with respect to the current cell according to the received signal level, wherein determining the camping parameter comprises:

receiving a minimum access level of the current cell sent by a base station serving the current cell and a maximum transmit power of the user equipment on a signaling channel;

obtaining a maximum output power of the user equipment; and calculating the camping parameter according to the minimum access level of the current cell, the maximum transmit power of the user equipment on the signaling channel, the maximum output power of the user equipment, and the received signal level;

means for compensating for the camping parameter by combining the camping parameter with a selected compensation value and resulting in a compensated camping parameter, wherein the selected compensation value is determined from a mapping between a plurality of compensation values and camping parameter values, the mapping defined according to a compensation function for the plurality of compensation values and the camping parameter values, wherein compensating for the camping parameter comprises compensating for the camping parameter using piecewise linear compensation, and wherein compensating for the camping parameter using piecewise linear compensation comprises:

determining a compensation interval in which the camping parameter is located according to a preset compensation interval, wherein determining the compensation interval in which the camping parameter is located according to the preset compensation interval comprises:

determining that the compensation interval is a first compensation interval when the camping parameter is less than a first camping parameter threshold;

determining that the compensation interval is a second compensation interval when the camping parameter is greater than or equal to the first camping parameter threshold and the camping parameter is less than a second camping parameter threshold;

determining that the compensation interval is a third compensation interval when the camping parameter is greater than or equal to the second camping parameter threshold and the camping parameter is less than a third camping parameter threshold; and determining that the compensation interval is a fourth compensation interval when the camping parameter is greater than or equal to the third camping parameter threshold;

determining the selected compensation value corresponding to the compensation interval in which the camping parameter is located according to a preset correspondence between the compensation interval and the selected compensation value, wherein determining the selected compensation value corresponding to the compensation interval in which the camping parameter is located according to the preset correspondence between the compensation interval and the selected compensation value comprises:

determining that the selected compensation value is a first compensation value when the compensation interval is the first compensation interval;

determining that the selected compensation value is a second compensation value when the compensation interval is the second compensation interval;

determining that the selected compensation value is a third compensation value when the compensation interval is the third compensation interval; and determining that the selected compensation value is a fourth compensation value when the compensation interval is the fourth compensation interval; and adding the camping parameter and the selected compensation value to make the compensated camping parameter; and means for determining that the user equipment camps on the current cell when the compensated camping parameter exceeds a preset camping threshold.

6. The device according to claim 5, further comprising:
means for performing cell reselection when the preset camping threshold exceeds the compensated camping parameter.

7. The method according to claim 1, wherein:
the first compensation value is greater than the second compensation value;

the second compensation value is greater than the third compensation value; and the third compensation value is greater than the fourth compensation value.

8. The user equipment according to claim 3, wherein:
the first compensation value is greater than the second compensation value;

the second compensation value is greater than the third compensation value; and the third compensation value is greater than the fourth compensation value.

9. The device according to claim 5, wherein:
the first compensation value is greater than the second compensation value;

the second compensation value is greater than the third compensation value; and the third compensation value is greater than the fourth compensation value.

\* \* \* \* \*